United States Patent [19]

Schweer et al.

[11] Patent Number: 5,243,225
[45] Date of Patent: Sep. 7, 1993

[54] LOAD SHEDDING SYSTEM

[75] Inventors: G. Carl Schweer; Ian D. Van Zyl, both of Peterborough, Canada

[73] Assignee: 564935 Ontario Limited, Canada

[21] Appl. No.: 882,374

[22] Filed: May 6, 1992

Related U.S. Application Data

[63] Continuation of Ser. No. 735,117, Jul. 24, 1991, abandoned, which is a continuation of Ser. No. 584,914, Sep. 18, 1990, abandoned.

[30] Foreign Application Priority Data

Sep. 18, 1989 [CA] Canada ................................ 611840

[51] Int. Cl.$^5$ .............................................. H02J 3/14
[52] U.S. Cl. ......................................... 307/38; 307/30; 307/31
[58] Field of Search ................ 307/30, 31, 35, 38, 307/40, 85, 86; 360/170, 171; 340/310 A

[56] References Cited

U.S. PATENT DOCUMENTS 4,357,598  11/1982  Melvin, Jr. .................... 340/310 A
4,471,232  9/1984  Peddie et al. ......................... 307/35

Primary Examiner—Jeffrey A. Gaffin
Attorney, Agent, or Firm—Hoffman, Wasson & Gitler

[57] ABSTRACT

Apparatus for controlling consumer usage of electric power by selective load shedding during peak periods comprises, in combination: a) a transmitter capable of transmitting a burst of a desired duration of electrical pulses of a selected frequency through each phase of a power transmission line; b) at least one group of receivers, each group of receivers including at least one receiver, each receiver being provided with means for detecting the duration of a burst of said pulse and actuating or deactuating an electrical device in response thereto.

2 Claims, 3 Drawing Sheets

LOAD SHEDDING SYSTEM

This is a continuation of copending application Ser. No. 07/735,117 filed on Jul. 24, 1991, now abandoned, which is a continuation of Ser. No. 07/584,914 filed on Sep. 18, 1990, now abandoned.

The present invention relates to the of consumer usage of power supplied by a utility company. In particular, the present invention provides a novel system for efficient and cost-effective load-shedding during peak power usage periods.

Local utility companies are usually billed by electric companies on the basis of highest peak demand recorded during a billing period. This is because an electric company must use that demand level as the basis for future allocation of power resources, since its total output cannot, by definition, be exceeded by the highest accumulative simultaneous peak demand of its customers. Therefore, utility companies have developed load shedding methods to reduce peak demand. Typically, such methods employ power line carrier or radio transmission systems to turn off, temporarily, heavy consumer loads such as water heaters during peak periods.

There are drawbacks to known systems of load shedding. Power line carrier systems typically employ neutral injection at relatively low frequencies, thereby allowing transmission through transformers and over long distances. Transmitters required to achieve this are, however, quite expensive. Receivers are fairly inexpensive, though.

Other known load shedders employ radio transmitters and receivers which both are quite costly and sophisticated.

The object of the present invention is to provide a novel load shedding method and apparatus which is inexpensive, reliable, and simple. Other objects and advantages of the present invention will become apparent in view of the description of the present invention which follows:

In a broad aspect, the present invention relates to apparatus for controlling consumer usage of electric power by selective load shedding during peak periods comprising, in combination: (a) a transmitter capable of transmitting a burst of a desired duration of electrical pulses of a selected frequency through each phase of a power transmission line; (b) at least one group of receivers, each group of receivers including at least one receiver, each receiver being provided with means for detecting the duration of a burst of said pulse and actuating or deactuating an electrical device in response thereto.

In drawings which illustrate the present invention by way of example:

Each embodiment of the present invention is made up of load shedding systems, each system being one transmitter and one or more receivers. One receiver is required for each load to be controlled.

Figure 1:
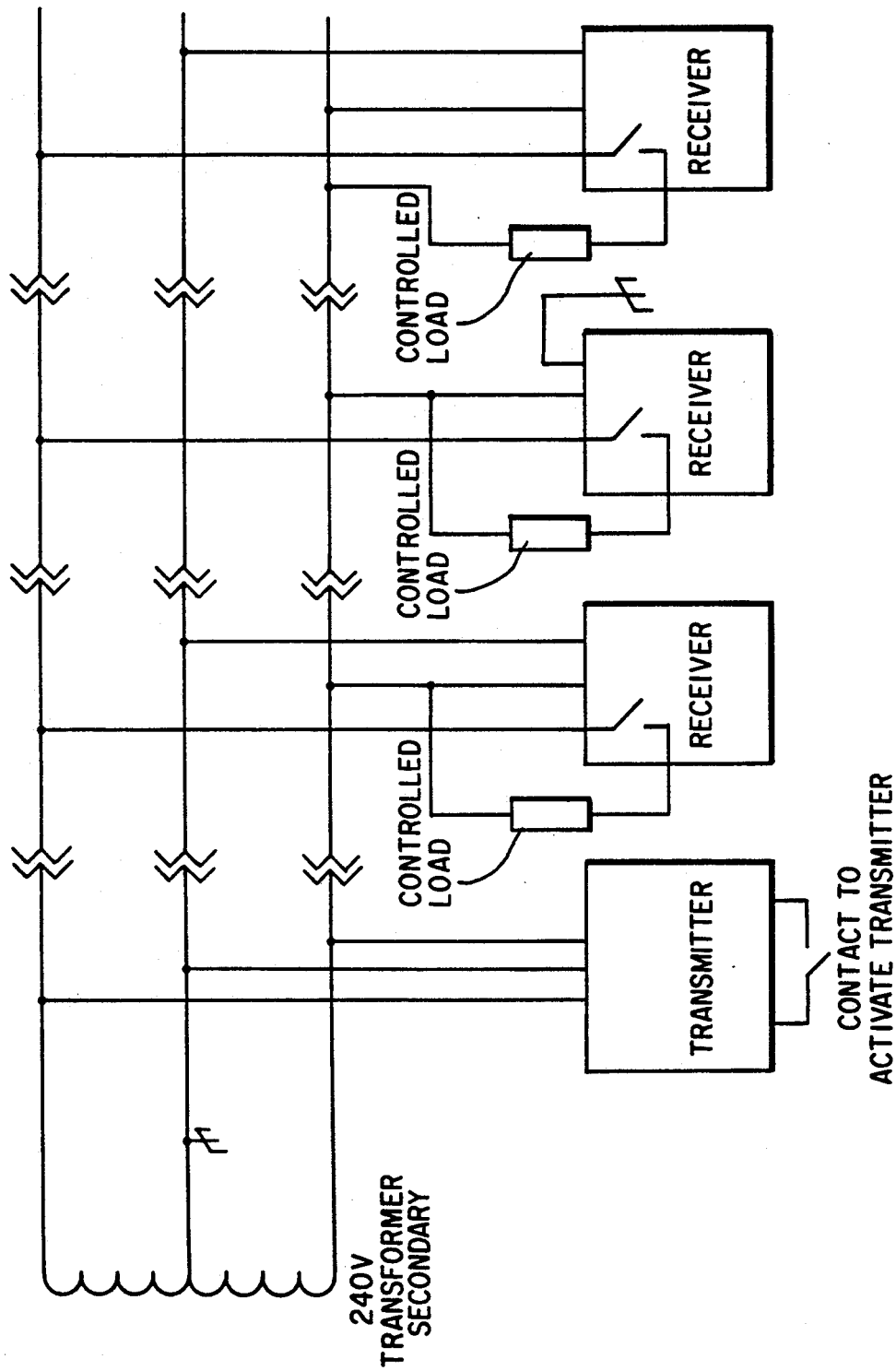
FIG. 1 is a schematic of a typical 240 V application of the present invention.
Figure 2:
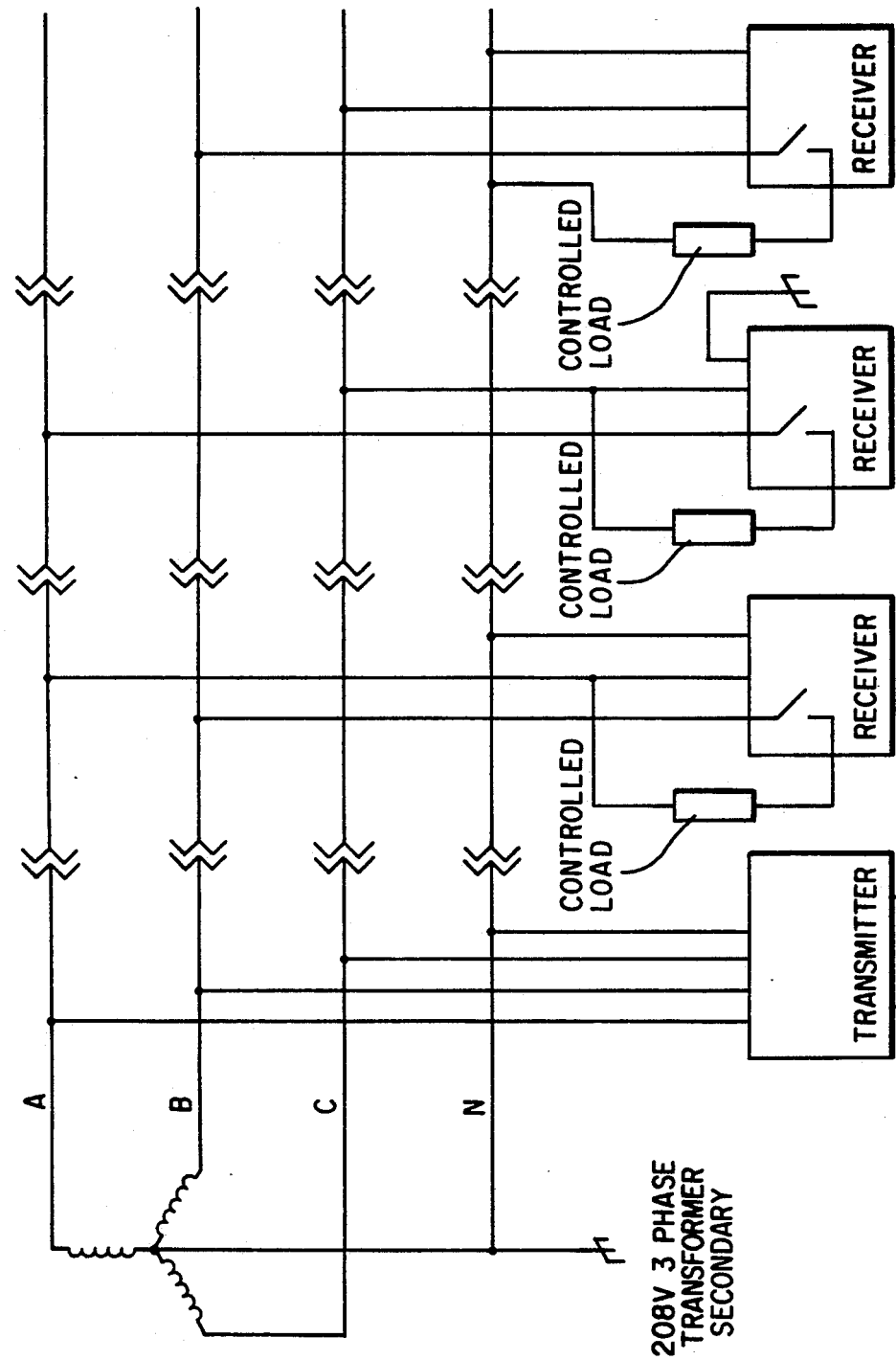
FIG. 2 is a schematic of a typical 208 V application of the present invention.

A preferred embodiment of the present invention is illustrated in FIG. 2. In this case, a utility has a delta-wye distribution transformer providing 208 V, 3 phase power to a group of consumers. A phase injection transmitter is connected to the secondary of the distribution transformer, and is capable of coupling bursts of pulses at a fixed frequency, for instance 18 kHz, hereinafter referred to as the 'carrier frequency', between each of the phases and neutral. In this regard, the phase injection transmitter utilizes an isolating transformer, as illustrated, and capacitor (not illustrated). The transmitter controls the number of pulses of the carrier frequency which are transmitted during each burst.

The bursts of pulses are received by remote receivers, as noted one for each load which one desires to control. The remote receiver is located adjacent the load control. The receivers are divided into two or more groups per system, so that loads may be taken off and brought on to line at intervals. This reduces the peak load which would occur if all loads are brought back on line at the same time, while reducing consumer inconvenience to a practical minimum by load shedding from the number of loads required at any one given time and not more.

The receivers in each group of receivers are actuated by detection of pulse interval. If we take a simple example, a system having two groups of receivers, Group A and Group B, the operation of a system can be understood by the following example:

EXAMPLE 1

A burst of pulses of length X or longer is interpreted by all receivers as meaning "turn off the load". $X = 16384$.

A burst of pulses of length Y or longer, but not longer than X, where X is greater than Y, is ignored by Group A receivers, and is interpreted by Group B receivers as meaning "turn on the load". $Y = 8192$.

A burst of pulses of length Z or longer, but not longer than Y, where Z is less than Y, and Y is less than X, is ignored by Group B receivers and is interpreted by Group A receivers as meaning "turn on the load". $Z = 2048$.

The transmitter will, to issue a command, send out in usual circumstances more than the minimum number of pulses required to carry out this specific function, as this gives the system a degree of immunity from noise which might cause the loss of some pulses. In this example, it might be prudent to program X as 20480 pulses, X as 12288 pulses, and Z as 4096 pulses.

The receivers are arranged so that when power is applied, they will be in the off state until a signal is received instructing them to turn on. This reduces inrush current due to loads being connected at once.

The phase injection transmitter is connected to a communication receiver, which via a communications link is connected to a remote transmitter which may be located in the utilities' office. The remote transmitter will at all times be sending out a signal to the phase injection transmitter, either an ON or an OFF signal. This signal is read by the phase injection transmitter which responds as follows:

If the receiver output is ON, then at pre-set intervals of for instance, 30 minutes, the phase injection transmitter sends out an ON signal to Group A and Group B receivers to insure that electrical devices making up the load are kept in a power ON condition.

If the output signal of the receiver changes from ON to OFF, then a signal is sent by the phase injection transmitter to turn OFF all groups. If the output is in the OFF state, there is no response, and if the output changes from OFF to ON, then a signal is sent to Group A receivers first, and then Group B receivers to turn on their respective loads.

It should be noted that since the phase injection transmitter couples signals onto all three phases, the signals may be detected by a receiver between any phase and neutral. Since neutral and ground are generally connected together in domestic distribution systems, a receiver may also detect a signal between any phase and ground if a separate neutral is not available at the load. Since the phase injection transmitter couples the signals in phase onto all three phases it should be noted that the signal will not be present between any two given phases, but will only be present between any phase to neutral.

It should also be noted that it is possible to connect the controlled load between any two phases. It is also possible to control a 120 V load so long as two phases are available at the load for signal transmission.

Figure 3:
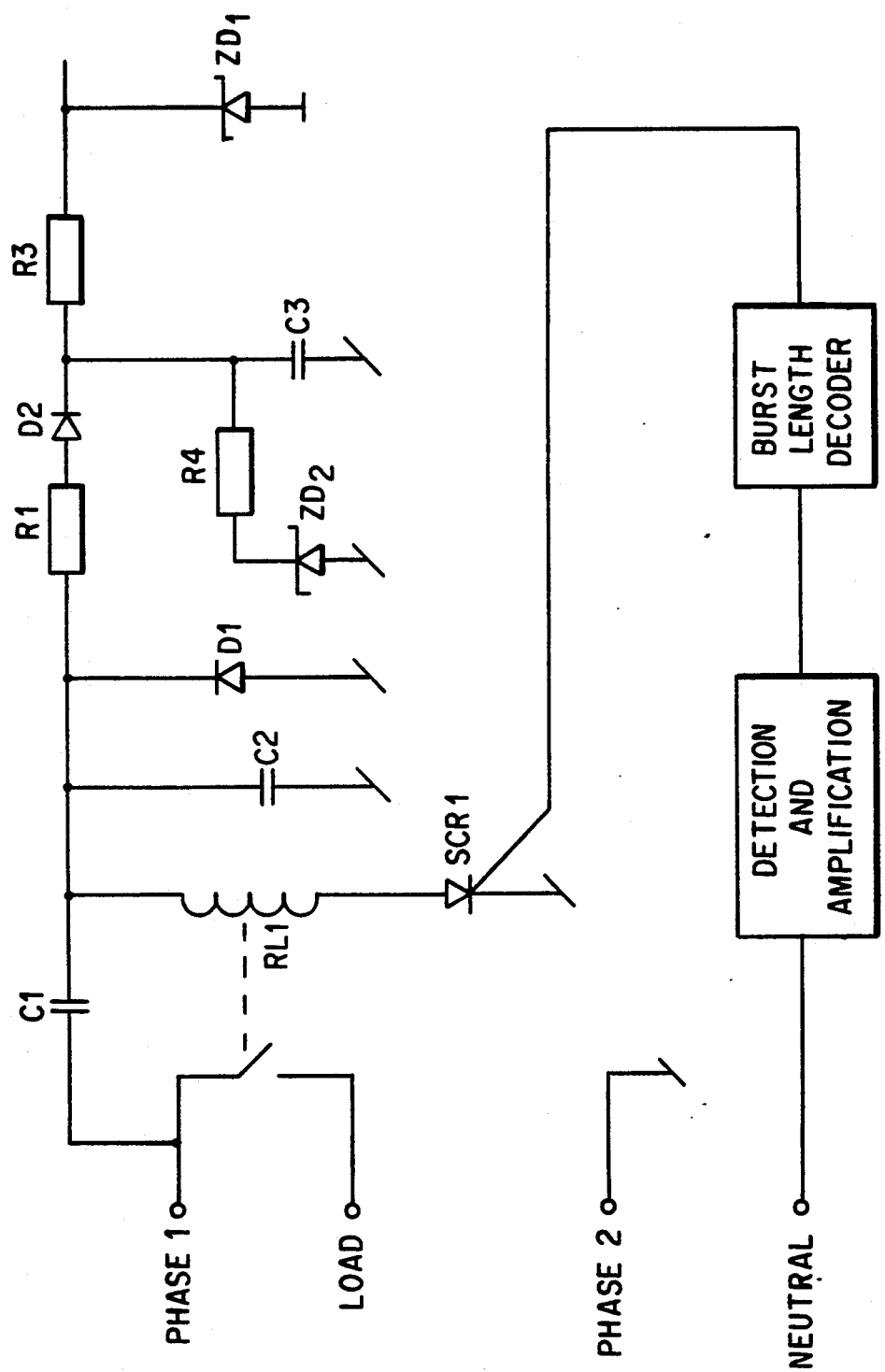
FIG. 3 is a block diagram of a typical receiver.

Referring now to FIG. 3, a receiver is illustrated in detail.

RL1 is the relay used to connect the load, and is provided with a DC coil. The power supply for the relay is provided by C1 and C2. C1 and C2 form a capacitive voltage divider to reduce the AC voltage between phase 1 and phase 2 to the level required by the relay. SCR1 controls the relay, and rectifies the power supply.

R1, D2, R3, and ZD1 provide a regulated supply voltage for operation of decoding circuits. R4 and ZD2 limit the positive excursion of point A when RL1 is not operated, at which time the voltage across the relay rises.

A particular feature of the receiver circuit which should be noted is that the detection and amplifier circuits are connected between Phase 1 and neutral. The relay and its power supply are connected between Phase 1 and Phase 2. The divider formed by C1 and C2 forms a low impedance path to the carrier frequency and has the effect of reducing the impedance seen by the phase injection transmitter if connected between a phase and neutral.

It is to be understood that the examples described above are not meant to limit the scope of the present invention. It is expected that numerous variants will be obvious to the person skilled in the electrical engineering, controls design field, without any departure from the spirit of the present invention. The appended claims, properly construed, form the only limitation upon the scope of the present invention.

We claim:

1. Apparatus for controlling consumer usage of electric power by selective load shedding during peak periods comprising, in combination:

a) a phase injection transmitter capable of transmitting a burst of a desired duration of electrical pulses of a selected frequency through each phase of a power transmission line, said phase injection transmitter connected via a communication link to a remote transmitter provided at an easily accessible location;

b) at least one group of receivers, each group of receivers including at least two receivers, each receiver being provided with means for detecting the duration of a burst of said pulses and actuating or deactuating an electrical device in response thereto, each of said receivers decoding said pulses differently whereby a single burst of pulses can be utilized to control the actuation/deactuation of more than one electric device.

2. Apparatus as claimed in claim 1, wherein said receivers are provided in a group, in association with a three phase 208 V power line, each receiver being coupled between any phase and neutral, or ground.

* * * * *